(12) United States Patent
Permar

(10) Patent No.: US 6,299,766 B1
(45) Date of Patent: Oct. 9, 2001

(54) REVERSE OSMOSIS FILTERING APPARATUS WITH CONCENTRATE DILUTION

(76) Inventor: Clark Permar, P.O. Box 701, Bolinas, CA (US) 94924

(*) Notice: Subject to any disclaimer, the term of this patent is extended or adjusted under 35 U.S.C. 154(b) by 0 days.

(21) Appl. No.: 09/610,505

(22) Filed: Jul. 6, 2000

(51) Int. Cl.⁷ .............................. B01D 63/00; F04B 39/16
(52) U.S. Cl. .................. 210/195.2; 210/90; 210/137; 210/253; 210/321.66; 210/416.3; 417/313; 417/404; 417/216
(58) Field of Search .................. 210/321.66, 321.65, 210/137, 195.2, 416.1, 416.3, 110, 257.2, 90, 253, 252, 335, 652, 641; 417/404, 313, 216, 390, 399

(56) References Cited

U.S. PATENT DOCUMENTS

| | | |
|---|---|---|
| 4,342,651 * | 8/1982 | Ahrens . |
| 4,367,140 | 1/1983 | Wilson . |
| 4,793,153 | 12/1988 | Hembree et al. . |
| 5,204,001 * | 4/1993 | Tonelli et al. . |
| 5,306,428 * | 4/1994 | Tonner . |
| 5,462,414 | 10/1995 | Permar . |
| 5,482,441 | 1/1996 | Permar . |
| 5,628,198 | 5/1997 | Permar . |
| 5,647,973 * | 7/1997 | Desaulniers . |
| 6,017,200 | 1/2000 | Childs et al. . |
| 6,139,740 * | 10/2000 | Oklejas . |

\* cited by examiner

Primary Examiner—Joseph W. Drodge
Assistant Examiner—Terry K. Cecil
(74) Attorney, Agent, or Firm—Thomas R. Lange

(57) ABSTRACT

Liquid filtering apparatus includes a plurality of reverse osmosis filters for receiving seriatim under pressure a mixture of feed liquid and recirculated concentrate. Feed liquid such as salt water is introduced into the inlet of each reverse osmosis filter to dilute the recirculated concentrate.

20 Claims, 3 Drawing Sheets

US 6,299,766 B1

REVERSE OSMOSIS FILTERING APPARATUS WITH CONCENTRATE DILUTION

TECHNICAL FIELD

This invention relates to apparatus for providing a flow of pressurized liquid and passing the pressurized liquid through a plurality of reverse osmosis filters to separate the pressurized liquid into a permeate portion and a concentrate portion. The apparatus is particularly useful for desalinization of seawater.

BACKGROUND OF THE INVENTION

My U.S. Pat. No. 5,482,441, issued Jan. 9, 1996, discloses a system which can be utilized to desalinate seawater. The system includes a rotary variable displacement liquid pump and rotary metering device driven by a drive motor to pump liquid through containment structure and a single reverse osmosis filter.

My U.S. Pat. No. 5,462,414, issued Oct. 31, 1995 and U.S. Pat. No. 5,628,198, issued May 13, 1997, disclose other approaches to solving certain problems inherent in the prior art and have features in common, including the use of a reversible piston which cooperates with filter means to produce desalinated water.

U.S. Pat. No. 4,793,153, issued Dec. 27, 1998, discloses a prior art hydraulic circuit employing a reversible piston to accomplish "energy recovery" in a mixed-phase motor in a refrigeration system.

U.S. Pat. No. 4,367,140, issued Jan. 4, 1983, discloses apparatus for the reverse osmosis purification of water or other fluid wherein the water is forced into a module containing a membrane under pressure using two piston-cylinder assemblies mechanically inter-connected.

U.S. Pat. No. 6,017,200, issued Jan. 25, 2000, discloses an energy-recovery pump or pumping system which includes, in a double-action embodiment, first and second cylinders wherein respective first and second pistons, mounted to a common reciprocal reciprocating piston shaft, are mounted for reciprocating motion.

It is known to pump sea water or other liquid seriatim through a series of reverse osmosis filters, however, such arrangements are inefficient in that downstream filters tend to clog and operate with less efficiency since they receive essentially undiluted concentrate from upstream filters. This results in high operating costs and inefficiencies in the system.

DISCLOSURE OF INVENTION

The apparatus of the present invention, in common with some of the prior art patents noted above, is for the purpose of filtering liquid, such as sea water when the liquid is pressurized. However, the present invention is characterized by its ability to provide highly effective filtering with the expenditure of considerably less energy than the systems known in the prior art. As will be seen in greater detail below, the apparatus of this invention employs a plurality of reverse osmosis filters in a highly effective manner, as compared to prior art approaches using a plurality of reverse osmosis filters wherein each subsequent filter results in less recovery than filters upstream. Concentrate can be recirculated for refiltering without fouling the filters.

Each of the plurality of reverse osmosis filters employed in the liquid filtering apparatus of the present invention has an inlet, a permeate exit outlet and a concentrate exit outlet.

Liquid flow path defining means is connected to a liquid pump of the apparatus for receiving liquid under pressure and delivering the liquid under pressure separately to each of the reverse osmosis filters. The liquid flow path defining means inter-connects the reverse osmosis filters and provides liquid flow communication between the inlet of at least one of the reverse osmosis filters and the concentrate exit outlet of another of the reverse osmosis filters.

Liquid recirculation means is operatively associated with the plurality of reverse osmosis filters and with the liquid flow path defining means for recirculating under pressure liquid including concentrate produced by the reverse osmosis filters through the reverse osmosis filters seriatim.

The liquid recirculation means includes recirculation conduit means connected to an outlet of one of the reverse osmosis filters and to the concentrate exit outlet of another of the reverse osmosis filters as well as recirculation pump means for pumping liquid including concentrate through a liquid flow path loop at least partially defined by the reverse osmosis filters and the recirculation conduit means.

Other features, advantages, and objects of the present invention will become apparent with reference to the following description and accompanying drawings.

MODES FOR CARRYING OUT THE INVENTION

Figure 1:
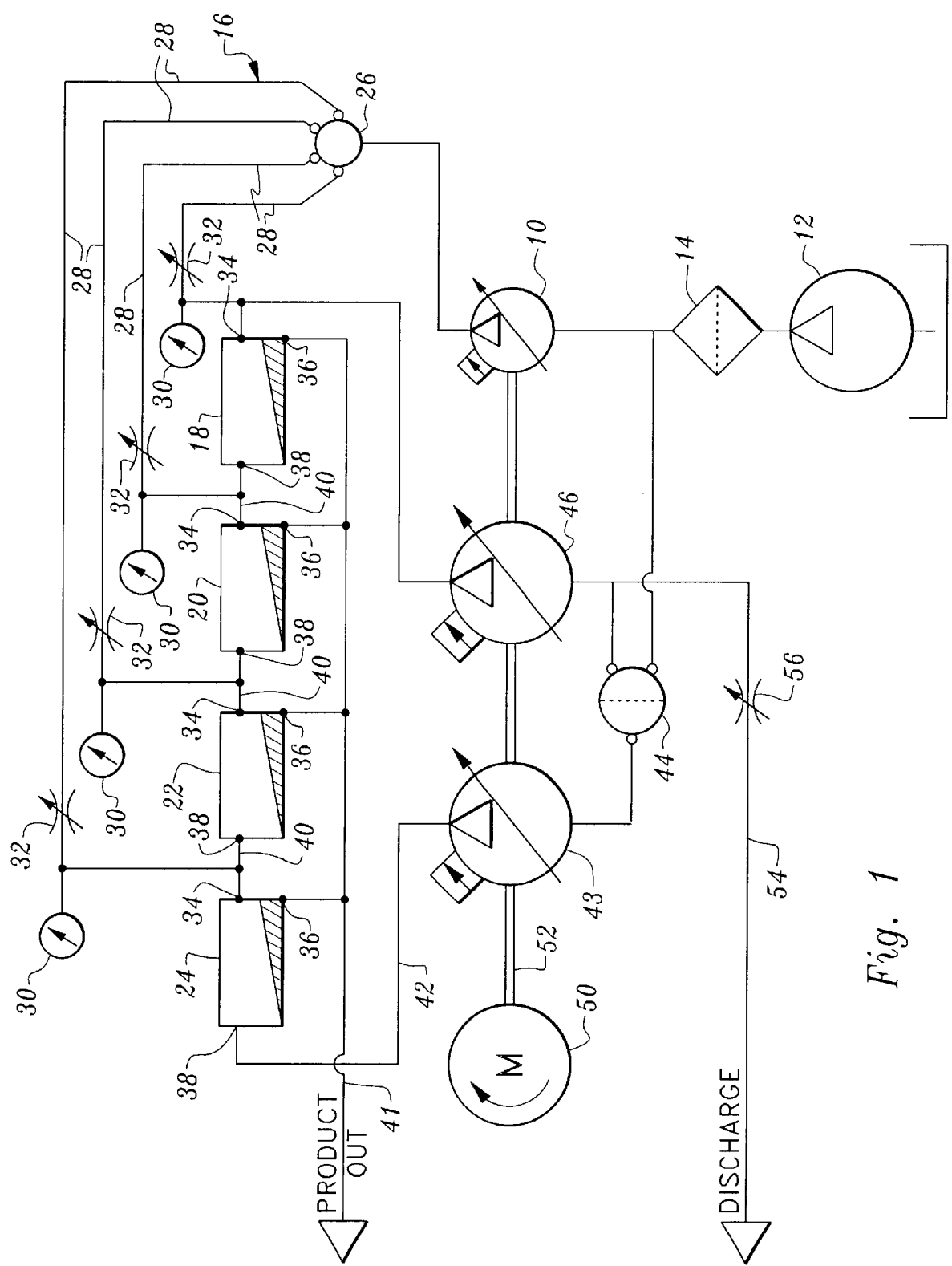
FIG. 1 is a schematic view illustrating an embodiment of apparatus constructed in accordance with the teachings of the present invention incorporating a plurality of reverse osmosis filters.

Referring now to FIG. 1, one embodiment of my invention includes a liquid pump 10 which receives a liquid, such as seawater, from a feed boost pump 12, the liquid passing through a filter 14 before being received by liquid pump 10. The disclosed liquid pump 10 is a variable displacement pressure compensated injection feed pump and is utilized to pressurize liquid received from feed boost pump 12 to a much higher pressure, e.g. from about 30 psi to about 800 psi. Liquid pump 10 could be a fixed displacement pump controlled by an adjustable speed drive.

Liquid flow path defining means 16 is connected to liquid pump 10 and distributes liquid under pressure separately to each of a plurality of reverse osmosis filters 18, 20, 22, 24. The liquid flow path defining means 16 includes a plenum 26 and four liquid delivery conduits 28, each of the latter leading a reverse osmosis filter. A pressure gauge 30 is operatively associated with each of the liquid delivery conduits to indicate the pressure of the liquid therein as is a variable liquid control valve 32 to adjust the pressure of the liquid prior to its entrance into a reverse osmosis filter. The plenum 26 equalizes the flow and pressure of the liquid entering the liquid delivery conduits.

Each of the reverse osmosis filters has an inlet 34, a permeate exit outlet 36 and a concentrate outlet 38. The permeate exit outlets 36 lead to an exit pipe 41.

It is to be noted that the inlets 34 of reverse osmosis filters 20, 22 and 24 are connected by lengths of conduit 40 to the concentrate exit outlets 38 of reverse osmosis filters 18, 20, 22, respectively, the lengths of conduit 40 comprising segments of the recirculation conduit means of a liquid recirculation means operatively associated with the reverse osmosis filters and with the liquid flow path defining means including liquid delivery conduits 28.

A length of conduit 42, also comprising part of the recirculation conduit means, is connected to the concentrate exit outlet 38 of reverse osmosis filter 24 and forms a continuous loop leading to the inlet 34 of reverse osmosis filter 18. In that loop is a rotary variable displacement pressure compensated recirculation pump 43, a plenum 44 and a rotary liquid metering device such as motor 46, the latter being illustrated as a variable displacement device. In this arrangement either recirculation pump 43 or metering pump 46 can be varied to control pressure through the closed liquid flow loop.

In the arrangement illustrated, a single prime mover in the form of a motor 50 utilizes a single drive shaft 52 to drive rotary pump 43, motor 46 and pump 10. The liquid pump 10 can be separate and driven independently as shown in my U.S. Pat. No. 5,482,441. The teachings of U.S. Pat. No. 5,482,441 are incorporated herein by reference.

It will be understood that with the arrangement described, seawater or other liquid is mixed with the recirculated concentrate prior to entering each of the reverse osmosis filters. This results in efficient operation of each of the filters, as compared to prior art approaches wherein the concentrate is passed seriatim through the filters without dilution in the train of filters. In the arrangement shown, reverse osmosis filters 20, 22 and 24 operate with the same efficiency as reverse osmosis filter 18.

Plenum 44 provides for the recirculation of the feed water and introduction thereof into the above-described enclosed recirculation system. Liquid flow from liquid pump 10 provides the necessary pressure to displace permeate portion water passing through the membranes of the reverse osmosis filters.

Connected to plenum 44 is a discharge pipe 54 having an adjustable flow control valve 56 operatively associated therewith to control feed water recirculation.

Figure 2:
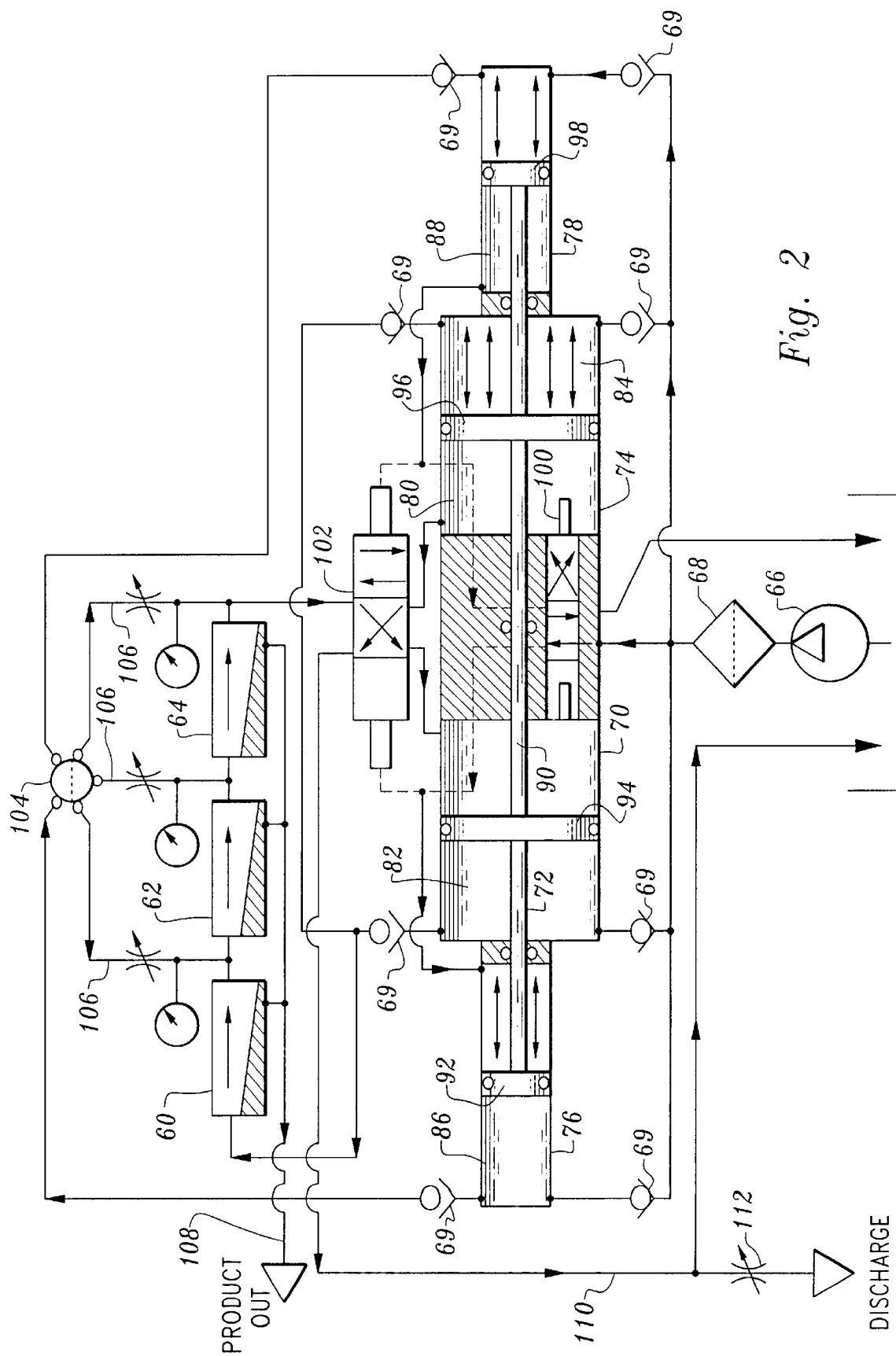
FIG. 2 is a schematic view illustrating an alternative embodiment of the apparatus.

FIG. 2 shows another embodiment of the invention which operates in accordance with the same general principles employed in the FIG. 1 embodiment wherein a controlled volume of seawater or other fluid flows from the discharge port of a fluid pump through a series or train of reverse osmosis filters. An additional flow of seawater equal in volume to the product water or permeate is provided and introduced into each reverse osmosis filter in equal proportions under the necessary pressure, e.g. in the order of 800 psi.

The injection, introduction or insertion of this flow into the circuit in the disclosed manner causes a correspondingly equal volume of water to exit the system through the reverse osmosis filters in the form of product water or permeate. Inversely, since the water leaving the high pressure "loop" is continuously being replaced by incoming seawater (or other liquid being treated), each reverse osmosis filter operates at optimum conditions, due to the fact that there is little salt enrichment of the feed stream or the system discharge. This allows for recirculation of some portion of the discharge water or concentrate back into the feed water which reduces feed water filtration and pretreatment expense and conserves energy. The membranes operate at optimum conditions.

In the arrangement of FIG. 2, three reverse osmosis filters 60, 62, 64 interconnected to form train of filters are employed.

Salt water or other liquid to be filtered is introduced into the system by a feed pump 66 which may operate, for example, at a pressure of around 200 psi.

My U.S. Pat. Nos. 5,462,414 and 5,628,198 disclose apparatus for providing a flow of pressurized liquid within a liquid filtering apparatus wherein a hydraulic cylinder and piston arrangement is employed to force the liquid under pressure through a single reverse osmosis filter, the piston reciprocating back and forth within the hydraulic cylinder under the influence of a relatively low pressure liquid to intensify the pressure of liquid displaced from the cylinder through the filter.

The apparatus embodiment of FIG. 2 hereof also employs a reciprocating piston arrangement for the purpose of delivering seawater or other liquid under pressure, in this instance to the plurality of reverse osmosis filters 60, 62 and 64.

FIG. 2 shows the apparatus in one stage of the operation thereof wherein the piston is being driven to the left, as viewed in FIG. 2, under the urging of pressurized liquid received from feed pump 66 and passing through a filter 68. Liquid flow through the piping or conduits and other structural members of the apparatus is depicted by arrowheads shown throughout the system. The various valves 69 associated therewith are shown in the appropriate open or closed positions, such valves being one-way valves.

The hydraulic cylinder of the apparatus is depicted by reference numeral 70 and the reciprocating piston slidably movable therein is depicted by reference numeral 72. Hydraulic cylinder 70 includes the double-ended central cylinder portion 74 and two end cylinder portions 76, 78. A divider 80 divides the central cylinder portion into two compartments 82, 84. End cylinder portion 76 defines another compartment 86 and end cylinder portion 78 defines another compartment 88. Seals separate compartments 86 and 88 from the compartments 82, 84, respectively.

Piston 72 includes a piston shaft or rod 90 which is slidably movable relative to the hydraulic cylinder and positionable in all of the four compartments. The piston additionally includes four spaced piston heads 92, 94, 96, and 98 which are movable along with the piston rod in a reciprocating fashion. The piston heads divide the compartments within which they are positioned into two subcompartments. That is, eight subcompartments are within the hydraulic cylinder. The piston heads can be fixedly attached to or detached from the piston rod. In the latter case the rod would be comprised of separate rod portions.

Located within divider 80 and movable with respect thereto is a pilot valve 100 which is displaced to the left when engaged by piston head 96 and to the right when engaged by piston head 94. The divider 80 and pilot valve 100 are in liquid flow communication with a reversing (retrack) valve 102 to control liquid flow through the system.

As indicated above, FIG. 2 shows the apparatus in one stage of the operation. In this stage the piston is being driven to the left (as viewed in FIG. 2) by liquid from feed pump 66 being received in certain subchambers of the cylinder. A review of FIG. 2, and in particular the liquid flow arrows thereof, will show that three subcompartments are being simultaneously pressurized by liquid from pump 66. These three subchambers are those accommodating the depicted double-headed arrows, and piston heads 92, 96 and 98 are being driven directly to the left along with the rest of the piston. Liquid from the subchamber to the left of piston head 92 is being directed under pressure to a plenum 104. The plenum 104 in turn delivers the liquid, which is salt water or other feed liquid previously received from feed pump 66, to liquid delivery conduits 106 leading to the inlets of reverse osmosis filters 62, 64. As in the case of the arrangement of FIG. 1, pressure gauges and adjustable flow control valves are associated with each of the liquid delivery conduits.

At the same time piston head 92 is delivering liquid to the reverse osmosis filter inlets in the manner just described, concentrate is being driven by piston head 94 seriatim through the train or series of reverse osmosis filters 60, 62 and 64. Permeate will exit pipe or conduit 108 and the mixture of concentrate and introduced liquid will be recirculated back into the cylinder.

The small piston head 98 acts a pressure intensifier and a pressure of delivery to the reverse osmosis filters can be in the order of 800 psi.

Excess or spent liquid can be discharged from the system through a discharge conduit 110 and an adjustable flow control valve 112 is employed to adjust recirculation flow.

It will be appreciated that when the piston has moved completely to the left as viewed in FIG. 2, pilot valve 100 will shift position and cause a shift of the retrack valve 102 as well. This will cause a complete reversal in the operation with flow proceeding from right to left in the reverse osmosis filters and the subchambers immediately to the left of piston heads 92, 94 and 98 serving as the "driving" subchambers and a mixture of concentrate and feed water or other liquid being delivered to the reverse osmosis filters through plenum 104 from the subchambers to the immediate right of piston heads 96 and 98.

Figure 3A:
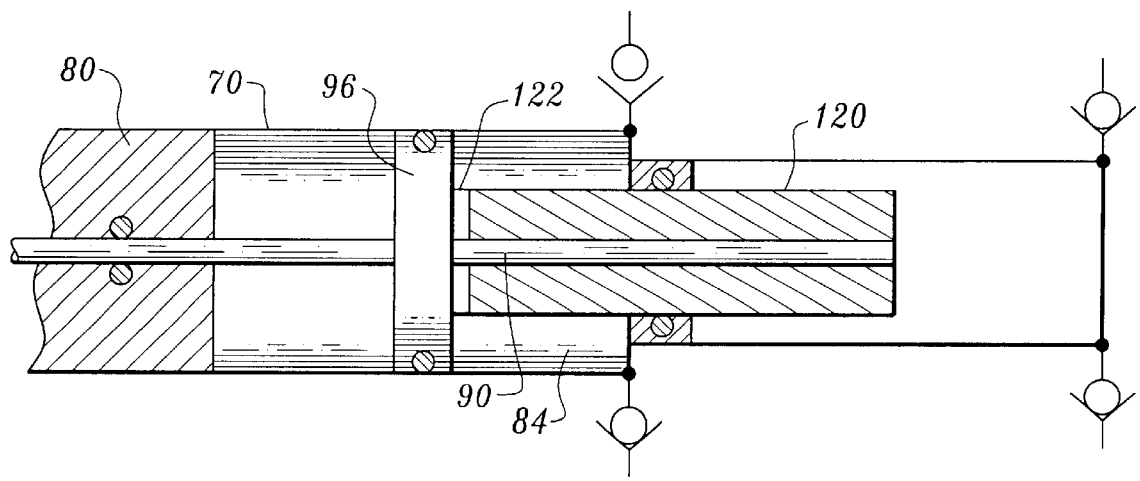
FIGS. 3A and 3B are schematic representations, in partial cross-section, illustrating portions of reciprocating pumps which may be utilized to recirculate liquid under pressure in accordance with the teachings of the present invention.
Figure 3B:
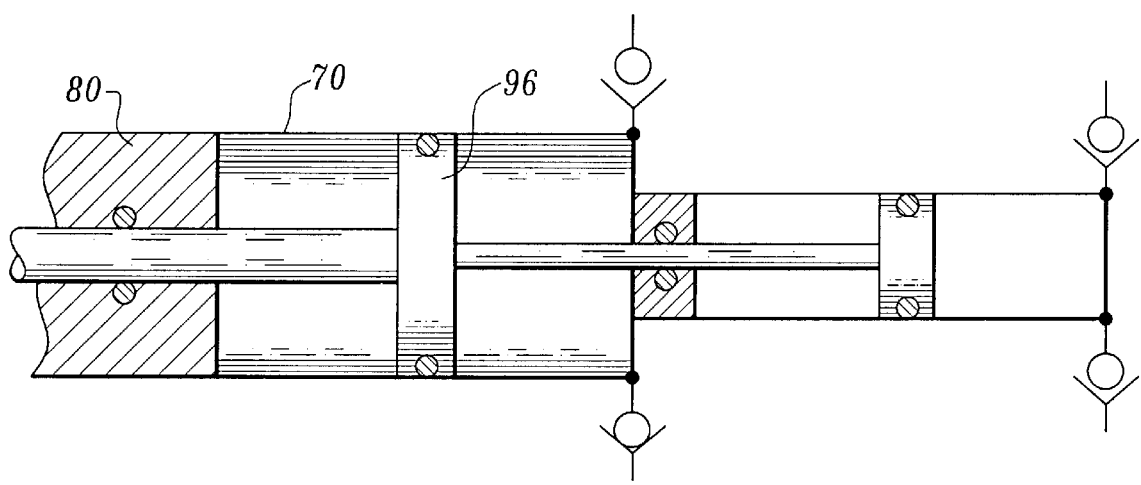

Other types of cylinder and piston configurations can be employed when practicing this invention. FIG. 3A, for example, shows an arrangement wherein the endmost piston heads (only the right one being shown) each comprise a ram cylinder 120 having one closed end, the ram cylinder 120 attached to the piston rod or shaft 90 and vented at 122 to compartment or chamber 84. FIG. 3B shows a piston shaft or rod which is of differing diameter on opposed sides of piston head 96. With this approach, the difference in volume occupied by the rod creates part of the displacement.

The invention claimed is:

1. Liquid filtering apparatus comprising, in combination:
   a plurality of reverse osmosis filters, each of said reverse osmosis filters having an inlet, a permeate exit outlet and a concentrate exit outlet;
   a liquid pump;
   liquid flow path defining means connected to said liquid pump for delivering feed liquid under pressure to said plurality of reverse osmosis filters, said liquid flow path defining means providing concentrate flow communication between the concentrate exit outlet of each reverse osmosis filter to the inlet of another one of said plurality of reverse osmosis filters, said liquid flow path defining means including branch liquid flow paths adapted to deliver said feed liquid separately to each said reverse osmosis filter to separately dilute each concentrate stream flowing therefrom; and
   liquid recirculation means operatively associated with said plurality of reverse osmosis filters and with said liquid flow path defining means for recirculating under pressure liquid including concentrate produced by said reverse osmosis filters through said reverse osmosis filters seriatim.

2. The liquid filtering apparatus according to claim 1 wherein said liquid recirculation means includes recirculation conduit means connected to an inlet of one of said reverse osmosis filters and to the concentrate exit outlet of another of said reverse osmosis filters and recirculation pump means for pumping liquid including concentrate through a liquid flow path loop including said reverse osmosis filters and said recirculation conduit means.

3. The liquid filtering apparatus according to claim 2 wherein said recirculation pump means comprises a variable displacement pump.

4. The liquid filtering apparatus according to claim 3 additionally comprising pressure control means for receiving liquid and concentrate from said variable displacement pump and cooperable therewith to selectively vary the pressure of liquid and concentrate flowing through said recirculation conduit means.

5. The liquid filter apparatus according to claim 4 wherein said pressure control means comprises a flow control device for controlling flow of liquid and concentrate flowing therethrough.

6. The liquid filter apparatus according to claim 5 wherein said flow control device comprises a rotary liquid metering pump.

7. The liquid filter apparatus according to claim 4 additionally comprising liquid conduit means extending from said liquid flow path defining means to said liquid recirculation means for introducing liquid into said liquid recirculation means.

8. The liquid filter apparatus according to claim 7 additionally comprising a plenum connected to said liquid conduit means and in fluid flow communication with said variable displacement pump and with said pressure control means.

9. The liquid filtering apparatus according to claim 1 wherein said liquid flow path defining means includes a plenum for receiving liquid from said liquid pump and a plurality of liquid delivery conduits, each conduit defining a respective branch flow path and extending from said plenum to each of said reverse osmosis filters.

10. The liquid filtering apparatus according to claim 9 additionally comprising a pressure gauge operatively associated with each of said liquid delivery conduits for monitoring the pressure of liquid therein.

11. The liquid filtering apparatus according to claim 3 additionally comprising a prime mover for driving both said variable displacement pump and said liquid pump, said liquid pump being a variable displacement pump.

12. The liquid filtering apparatus according to claim 8 additionally comprising a liquid outlet conduit in fluid flow communication with said plenum and an adjustable flow control valve for controlling liquid flow into said liquid recirculation means.

13. The liquid filtering apparatus according to claim 9 additionally comprising an adjustable flow control valve operatively associated with each of said plurality of liquid delivery conduits for controlling flow of liquid through each of said liquid delivery conduits.

14. The liquid filtering apparatus according to claim 5 wherein said liquid pump and said variable displacement pump are rotary pumps and wherein said flow control device comprises a rotary flow control device, said rotary pumps and said rotary flow control device being connected to a common drive shaft.

15. The liquid filtering apparatus according to claim 1 wherein said liquid pump includes a hydraulic cylinder and a reciprocating piston slidably mounted within said hydraulic cylinder.

16. The liquid filtering apparatus according to claim 15 wherein said liquid recirculation means includes recirculation conduit means connected to an inlet of one of said reverse osmosis filters and to the concentrate exit outlet of another of said reverse osmosis filters, said recirculation conduit means, said hydraulic cylinder and said reciprocating piston comprising said recirculation pump means.

17. The liquid filter apparatus according to claim 16 wherein said hydraulic cylinder has four compartments and wherein said reciprocating piston includes a piston shaft slidably movable relative to said hydraulic cylinder and positionable in all of said four compartments, said piston additionally including four spaced piston heads, one of said piston heads located in each compartment and forming eight subcompartments which vary in size during movement of said piston during operation of the liquid filter apparatus.

18. The liquid filter apparatus according to claim 17 additionally comprising a feed pump for delivering liquid under pressure to said hydraulic cylinder and valves for selectively directing liquid into a plurality of said subcompartments while simultaneously selectively discharging liquid out of other of said subcompartments to cause reciprocation of said piston.

19. The liquid filter apparatus according to claim 18 wherein liquid discharged from said subcompartments during reciprocation of said piston includes concentrate and is passed seriatim through said plurality of reverse osmosis filters under pressure by said piston.

20. The liquid filter apparatus according to claim 18 wherein said cylinder includes a double-ended central cylinder portion and two end cylinder portions attached to opposed ends of said central cylinder portion, said central cylinder portion forming two of said compartments and each of said end cylinder portions forming one of said compartments, said valves simultaneously directing liquid from said feed pump into at least three subcompartments to drive said piston.

* * * * *